United States Patent [19]

Rilly et al.

[11] Patent Number: 4,975,823
[45] Date of Patent: Dec. 4, 1990

[54] SWITCHED POWER SUPPLY WITH CURRENT MODE REGULATION

[75] Inventors: Gerard Rilly, Unterkirnach; José Rodriguez, Villingen, both of

[73] Assignee: Deutsche Thomson-Brandt GmbH, Villingen-Schwenningen, Fed. Rep. of Germany

[21] Appl. No.: 431,514

[22] Filed: Nov. 3, 1989

Related U.S. Application Data

[63] Continuation-in-part of Ser. No. 346,097, May 2, 1989, abandoned, which is a continuation of Ser. No. 250,240, Sep. 28, 1988, abandoned.

[30] Foreign Application Priority Data

Sep. 30, 1987 [DE] Fed. Rep. of Germany ....... 3733474

[51] Int. Cl.⁵ .......................................... H02M 3/335
[52] U.S. Cl. ....................................... 363/56; 363/21; 363/49; 363/97
[58] Field of Search .................... 363/18–21, 363/49, 56, 97, 131

[56] References Cited

U.S. PATENT DOCUMENTS

| | | | |
|---|---|---|---|
| 4,037,271 | 7/1977 | Keller | 363/21 |
| 4,276,586 | 6/1981 | Boekhorst | 363/21 |
| 4,316,242 | 2/1982 | Colangelo et al. | 363/21 |
| 4,347,559 | 8/1982 | Sturgeon | 363/21 |
| 4,459,651 | 7/1984 | Fenter | 363/21 |
| 4,616,301 | 10/1986 | Small | 363/26 |
| 4,772,995 | 9/1988 | Gautherin et al. | 363/21 |
| 4,864,485 | 9/1989 | Rilly et al. | 363/49 |

FOREIGN PATENT DOCUMENTS

| | | |
|---|---|---|
| 2417628 | 10/1975 | Fed. Rep. of Germany . |
| 2912171 | 10/1979 | Fed. Rep. of Germany . |
| 3518195 | 11/1986 | Fed. Rep. of Germany . |
| 3546161 | 7/1987 | Fed. Rep. of Germany . |
| 2585897 | 2/1987 | France . |

OTHER PUBLICATIONS

Toute L'eletronique, Feb. 1987, No. 521, pp. 44–47, entitled COMMANDE DES and translation.
Elektrotechnik, 61, Oct. 26, 1979, pp. 24–28 entitled Einfachund betriebssicher and translation.
Elektronikpraxis, No. 6, Jun. 1981, pp. 41–50 entitled Spannungen von 90 bis 270 V and translation.
Funkschau 1975, H.5., pp. 40–43 entitled Ein Sperrwandler–Netzmodul mit Netztrennung and translation.
Elektronik 1980, H. 6., pp. 92–96 entitled Schaltnetzteile nach dem Flyback-Verfahren and translation.
Funk-Technik, 37, 1982, H.1, pp. 21–25 entitled Sperrwandlernetzteil mit kommerziellen Eigenschaften (and translation).
Fritz, Glenn; UC3842 Provides Low-Cost Current Mode Control, Application Note U-100, Unitrode Corp. Lexington, MA.

*Primary Examiner*—Peter S. Wong
*Attorney, Agent, or Firm*—Joseph S. Tripoli; Joseph J. Laks; Harvey D. Fried

[57] ABSTRACT

A switched mode power supply operating with current mode regulation comprises an output switch coupled to a first winding of a transformer and to a source of input supply voltage. The switch is responsive to a control signal for initiating a pulse width modulated pulse voltage in a second winding of the transformer. A supply circuit coupled to the second winding generates an operating voltage. A feedback signal source monitors both current flowing through the first winding and the operating voltage. A control circuit coupled to the feedback signal source includes an oscillator for generating the control signal at a substantially constant frequency during normal operation and at a variable frequency during abnormal operation. The control circuit is responsive both to the current and to variations of the operating voltage over a regulating range, in a negative feedback loop. The control signal varies the on-time conduction of the output switch in each cycle to stabilize the operating voltage. The oscillator has a frequency control responsive to variations of the operating voltage outside of the regulating range, in a positive feedback loop. The on-time conduction of the output switch is limited to a maximum value by comparing the current to an error signal related to the operating voltage. The error signal varies when the operating voltage is within the regulating range but is limited in magnitude when the operating voltage falls below the regulating range. A DC feedback voltage forms a part of both the negative and positive feedback loops.

28 Claims, 2 Drawing Sheets

SWITCHED POWER SUPPLY WITH CURRENT MODE REGULATION

CROSS-REFERENCE TO RELATED APPLICATIONS

This is a continuation-in-part of then copending application Ser. No. 346,097, filed May 2, 1989, now abandoned. Application Ser. No. 346,097 is a continuation of then copending application Ser. No. 250,240, filed Sept. 28, 1988, now abandoned.

BACKGROUND OF THE INVENTION

This invention relates to a switched power supply operating with current mode regulation.

A switched power supply operating with current mode regulation may include a switching transistor which is coupled to the primary winding of a transformer and to a DC input voltage derived from the AC mains supply. The switching transistor is periodically switched between conduction and cutoff by a control voltage. The control voltage is supplied, for example, from an oscillator connected on the primary side of the transformer, or is generated on the secondary side of the transformer and then transferred to the primary side.

During the on-time of the switching transistor, magnetic energy is stored in the transformer from the input voltage source in the form of an upramping current flowing in the primary winding of the transformer. After the switching transistor is cut off, this stored magnetic energy is transferred via an induced voltage pulse to the secondary windings of the transformer. A corresponding charging current passes into the filter capacitors of the secondary side rectifier circuits.

The energy stored in the transformer is discharged into the secondary side rectifier circuits during the off-time of the switching transistor until current in the transformer secondary windings decreases to zero. Thereafter, a deadtime interval occurs when both the switching transistor and the rectifier circuits are non-conductive. The deadtime is terminated when the switching transistor is again switched into the conductive state and the transformer is again charged with magnetic energy in the form of current flowing in the primary winding.

During normal operation, the transformer is in the discharged state when the switching transistor is turned on. During malfunction or abnormal operation, a situation may arise where the discharge current of the transformer flows for a relatively long period in the secondary supply rectifier circuits and does not decrease to zero before the end of the off-time of the switching transistor. Such a situation may arise when the secondary side rectifier circuits are excessively loaded, when a short circuit is developed, or when components in the regulator control circuit fail. In this malfunction situation, the switching transistor undesirably becomes conductive to recharge the transformer before the transformer has been completely discharged. Such an operating mode is undesirable and may be hazardous because of the excessive currents and voltages that may be generated by the transformer.

Switched power supplies with current mode regulation typically employ one of two regulating schemes. One scheme requires that the switching transistor operate with a substantially constant on-time, and that the switching frequency be varied in a negative feedback fashion to control the output voltage. In the other scheme, the switching frequency is maintained substantially constant, and the on-time of the switching transistor is varied in a negative feedback fashion to control the output voltage. Regulation by varying frequency can present certain problems if the frequency crosses certain boundaries, for example, corresponding to the horizontal scanning frequencies $f_H$ and $2f_H$, where $f_H$ is approximately 15,734 Hz for an NTSC interlaced video signal. The greater the range of regulation necessary, the more likely the variable frequency is to cross one or more of the problem causing boundaries. The range of regulation is a function of the variables which must be compensated, for example, output power in the range of 10 watts to 100 watts and supply voltage in the range of 180 volts to 250 volts. Existing switched mode power supplies with variable frequency regulators cannot operate over such a range without crossing the boundaries. Regulation by varying frequency can also present problems under very light loading conditions, for example during standby operation. The operating frequency under these conditions can be undesirably high. On the other hand, a variable frequency regulator can respond quickly to overload and short circuit conditions by rapidly decreasing switching frequency, without necessarily turning off power to the load completely.

Regulation by constant frequency offers the advantage of operation at a frequency likely to undergo only small variations at most, and in any event too small to cross any of the problem causing boundaries. Regulation by constant frequency also offers the advantage of preventing high frequency operation under light loading conditions. However, regulation by constant frequency can be difficult to implement in conjunction with an overload protection scheme, which must override the tendency of the regulator to supply more and more energy to the load as the output voltage falls to levels indicative of overload or short circuit conditions. Even if the sense of the pulse width modulation were reversed during overload, so that the pulse width or on-time was reduced, the power would be reduced until no power was produced at all, although a complete shutdown due to a temporary overload condition may not be desirable. Very little range would be available between normal operation and complete shutdown. Moreover, regulation by constant frequency can be inappropriate during power supply start-up.

SUMMARY OF THE INVENTION

It is an aspect of this invention to provide a switched power supply operating with current mode regulation which combines the best features of both regulating schemes. The power supply operates with a variable frequency regulation, and pulse width modulation, during a start-up interval. The power supply operates at a substantially constant frequency during normal operation, utilizing only pulse width modulation of on-time to regulate the output voltage as heavy and light loading may require. The power supply operates with variable frequency regulation during overload and short circuit conditions. The pulse width modulation regulation is rendered less effective as the operating frequency falls further, both modes of regulation being available over a wide range of output voltages during overload conditions. In this range, the regulation by frequency variation predominates at the lower frequencies and the regulation by pulse width modulation predominates at the higher frequencies. At no time will the regulation scheme cause the frequency to increase under light loading conditions, as the substantially constant frequency represents a maximum frequency during normal operation. As compared with prior art power supplies described above, a power supply according to this aspect of the invention can provide regulation over the same output power range of 10 watts to 100 watts, for supply voltages which vary from 90 volts to 260 volts.

It is another aspect of the invention to provide a variable control signal for varying the frequency of the oscillator in the regulator during a startup interval and during abnormal operating conditions and a substantially constant control signal for fixing the frequency of the oscillator during normal operation. In accordance with this aspect, the reference voltage for the timing circuit which controls the switching frequency is not coupled to a fixed reference voltage, as is typical. Instead, the timing circuit is coupled to both a startup supply reference voltage during the startup interval and to a feedback signal indicative of the output voltage. The startup supply is supplanted by a constant voltage reference level during normal operation generated by the transformer and a rectifying circuit. The feedback signal remains substantially constant during normal operation, but will reflect the significant voltage reduction indicative of abnormal operating conditions, and drive the switching frequency lower.

An output switch of a switched power supply operating with current mode regulation is coupled to a first winding of a transformer and to a source of an input supply voltage. The output switch is responsive to a pulse width modulated control signal for generating a pulse width modulated pulse voltage in a second winding of the transformer. A supply circuit including a rectifier is coupled to the second winding for generating an operating voltage. A control circuit includes an oscillator for generating the control signal. The control circuit is responsive to the operating voltage for varying the control signal in a manner that varies the conduction of the output switch within each cycle of the pulse voltage to stabilize the operating voltage. It is an aspect of the invention that the pulse initiation frequency of the output switch will remain substantially constant throughout a wide range of normal load variations and operating conditions. Thus, during normal operation, the substantially constant switching frequency significantly reduces the resonance effects in the chassis circuitry which would otherwise result from continuous fluctuations in the switching frequency, particularly across the problem causing frequency boundaries.

A frequency control for the oscillator is responsive to the operating voltage and varies the repetition frequency of the control signal such that the pulse initiation frequency of the output switch decreases with decreasing operating voltage. The stabilized operating voltage, derived from the pulse voltage in the transformer will, in general, tend to decrease in the case of abnormal circuit operation such as overload operation, due to the collapsing pulse amplitudes in the transformer. The control circuit, responding to the voltage feedback of the operating voltage, will attempt to maintain stabilization of the output voltage by increasing the on-time of the output switch. It is yet another aspect of the invention that the control circuit will respond to abnormal operating conditions, for example overload of the voltage supply, by reducing the pulse initiation frequency when the pulse width modulator is no longer capable of stabilizing the supply voltage. More particularly, the frequency control input of the oscillator also responds to the decrease in operating voltage by reducing the pulse initiation frequency of the control signal that turns the switching transistor on. A reduced switching frequency results in an increased time separation between the times when the switching transistor is turned on. Thus, during abnormal operation, when the discharge of the magnetic energy of the transformer into the rectifier supply circuits takes a longer time, a concurrent, longer time period is maintained between turn-on instants of the switching transistor. In this manner, it is possible to prevent the switching transistor from being switched on in an undesirable manner before the transformer has completely discharged its stored magnetic energy.

The change in switching frequency under abnormal conditions may take place on a continuous basis, over a wide frequency range. The pulse width modulator forms part of a negative feedback control loop whereas the frequency control forms part of a positive feedback control loop. It is yet another aspect of the invention for the pulse width modulation to predominate at the high end of the frequency range and the frequency control to predominate at the low end of the frequency range.

Even though the invention employs both negative and positive feedback control loops, it is yet another aspect of the invention to utilize the same feedback signal as a modulating control input for both control loops. Since feedback of the operating voltage is already being used as a pulse width modulating control input to the control circuit, little extra circuitry need be provided to enable feedback of the operating voltage to also be used as a frequency control input to the oscillator portion of the control circuit.

It is yet another aspect of the invention to provide for frequency variation during a startup interval and during overload conditions. In accordance with this aspect, the reference voltage for the timing circuit which controls the switching frequency is not coupled to a fixed reference voltage, as is typical. Instead, the timing circuit is coupled to a startup supply reference voltage during the startup interval, which startup supply is supplanted by a constant voltage reference level during normal operation generated by the transformer and a rectifying circuit. The timing circuit is also coupled to a feedback signal indicative of the output voltage, which remains substantially constant during normal operation, but which will reflect a significant voltage reduction due to abnormal operating conditions, and drive the switching frequency lower.

DETAILED DESCRIPTION OF THE PREFERRED EMBODIMENTS

Figure 1:
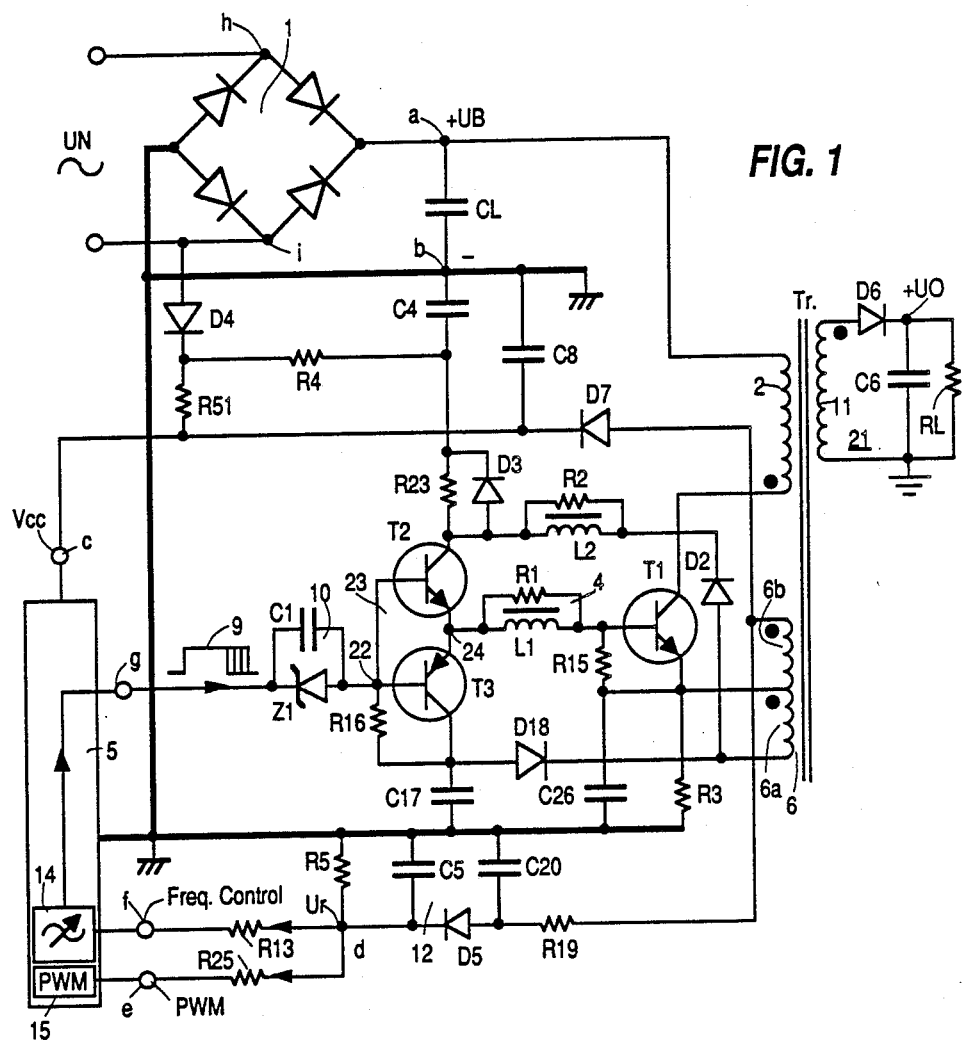
FIG. 1 illustrates a circuit schematic of first embodiment of a switched power supply operating with current mode regulation according to the invention; and, FIG. 2 illustrates a circuit schematic of an alternative embodiment.

With reference to FIG. 1, a source of AC mains supply voltage UN is coupled between input terminals h and i of a full-wave bridge rectifier 1, to generate a filtered DC input voltage +UB between an output terminal a of the bridge rectifier and a current return terminal b, which may be considered an earth or ground point. A capacitor CL provides filtering of input voltage +UB. AC mains supply voltage UN is unregulated and may vary between 90 VAC and 260 VAC.

Input voltage +UB is applied to the undotted end terminal of a primary winding 2 of a switched mode power supply transformer Tr. The dotted end terminal of primary winding 2 is coupled to the collector of an output switching transistor T1. The emitter of transistor T1 is grounded via a small sampling resistor R3 that samples the current in primary winding 2. A capacitor C26 filters the current-sampled voltage developed across resistor R3. Resistor R3 provides current limiting of the current in transistor T1 to prevent too great a current from flowing and damaging the transistor. The voltage at the emitter of transistor T1, being proportional to the current in primary winding 2, may be used for controlling a short-circuit protection circuit, not shown.

A secondary winding 11 of transformer Tr is coupled to a supply circuit 21 that generates a regulated DC operating voltage +U0 for supplying energy to a load circuit, schematically shown as a load resistor RL. In supply circuit 21, the anode of a rectifier or diode D6 is coupled to the dotted terminal of secondary winding 11 and the cathode is coupled to one terminal of a filter capacitor C6. The other terminal of filter capacitor C6 is coupled to the undotted terminal of secondary winding 11. The load circuit RL is coupled across capacitor C6 and is energized by the +U0 voltage which is developed across and filtered by the capacitor.

Figure 2:
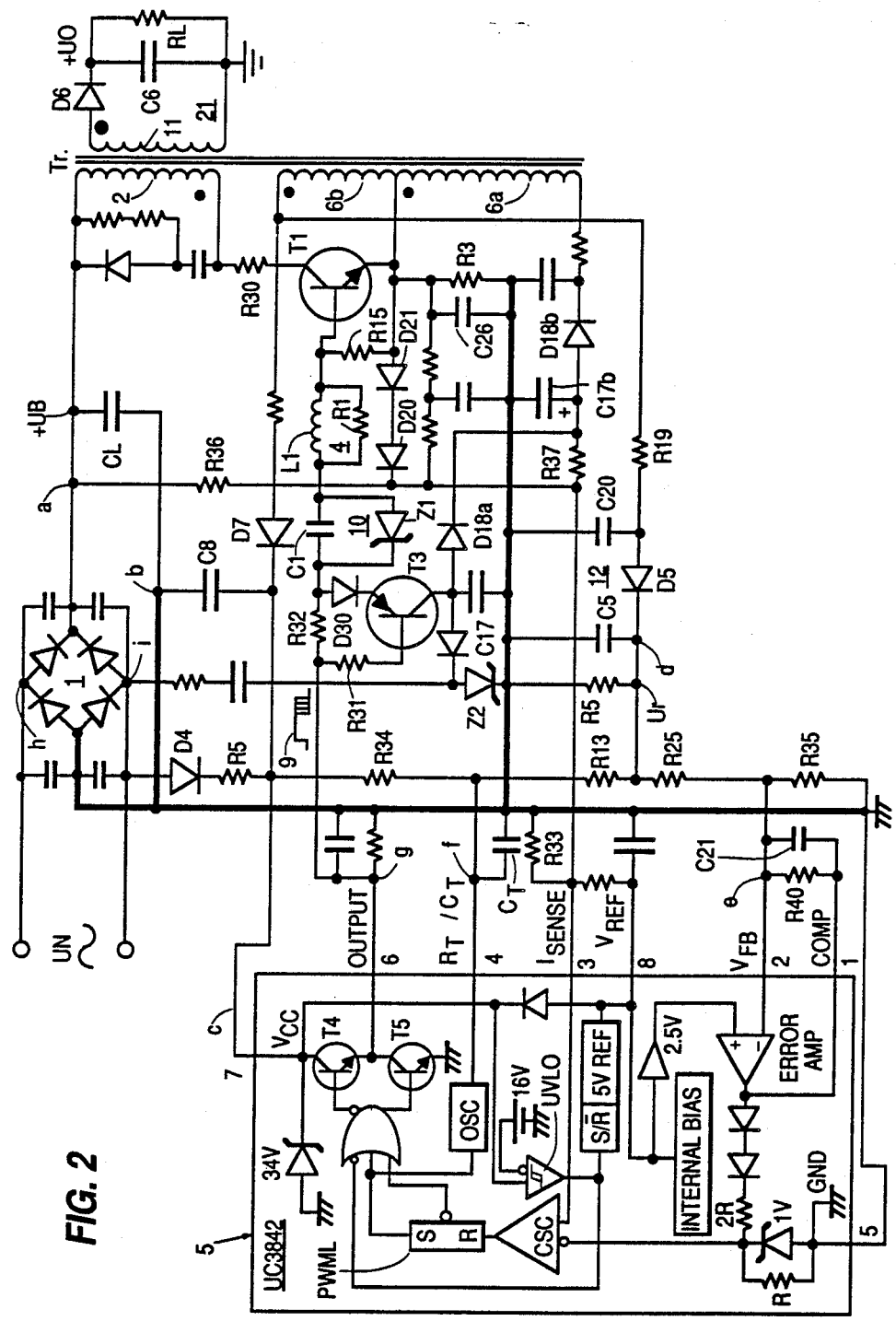

The +U0 operating voltage is generated by the switching of transistor T1. Transistor T1 is pulse-width modulated at a frequency that is determined in accordance with a pulse-width modulated, switching control voltage 9 developed at an output control terminal g of a control circuit 5. Control circuit 5 may be implemented as an integrated circuit control chip, for example, as shown in more detail in FIG. 2. The control circuit chip shown in FIG. 2 is part no. UC3842, available from Unitrode Corp., Lexington, Mass. Switching control voltage 9 is coupled to an input terminal 22 of a push-pull driver stage 23 via an impedance network 10, comprising a Zener diode Z1 in parallel with a speed-up capacitor C1.

Driver stage 23 comprises transistors T2 and T3 coupled in a push-pull configuration, wherein the bases of transistors T2 and T3 are coupled to input terminal 22 and the emitters are coupled to an output terminal 24 of driver stage 23. Output terminal 24 of driver stage 23 is coupled to the base of switching transistor T1 via an impedance network 4 comprising an inductor L1 in parallel with a resistor R1. A resistor R15 is coupled between the base and emitter electrodes of transistor T1.

In normal operation, during each cycle of the on-off switching of transistor T1, the high-level of switching control voltage 9 is level-shifted by Zener diode Z1 to turn on driver stage transistor T2. Collector current from transistor T2 is coupled to the base of transistor T1 via impedance network 4 to turn the transistor on.

With switching transistor T1 conductive, the +UB input supply voltage is developed across primary winding 2, with the dotted terminal of the primary winding being negative relative to the undotted terminal. Magnetic energy is being stored in transformer Tr during the on-time of transistor T1 in the form of an upramping primary winding current. No energy is being transferred to secondary supply circuit 21 during the on-time of transistor T1 because the negative voltage at the dotted terminal of secondary winding 11 reverse biases rectifier D6.

Control circuit 5 generates the low-level of switching control voltage 9 to turn switching transistor T1 off and thus end the magnetic energy storage interval. The low-level of switching control voltage 9 turns off transistor T2 and turns on transistor T3 of driver stage 23. With transistor T3 conductive, a negative voltage, developed across a capacitor C17, is applied to the base of switching transistor T1 via impedance network 4 to turn the switching transistor off. The negative voltage is also part of the base biasing of transistors T2 and T3, due to the negative voltage being coupled to driver stage input terminal 22 via a resistor R16.

The negative voltage is developed across capacitor 17 via a rectifier or diode D18 which rectifies the voltage developed across winding section 6a of secondary winding 6 during the off-time of transistor T1. Winding 6 is a tapped winding that splits the secondary winding into two winding sections 6a and 6b. The tap terminal of secondary winding 6 may be considered to be at the same AC potential as the bottom terminal of capacitor C17 because the tap terminal is coupled to the bottom terminal of the capacitor via sampling resistor 3 and parallel filter capacitor C26, which are each of low impedance at the relatively high switching frequencies of transistor T1.

During the run mode operation of the switched power supply operating with current mode regulation shown in FIG. 1, after a start-up interval has elapsed, the Vcc supply voltage for control circuit 5, developed at a terminal c is derived from the voltage developed in secondary winding section 6b by means of rectification by a rectifier D7 and filtering by a capacitor C8. During the start-up interval, however, when no voltage or only small amplitude voltages are generated in transformer Tr, the Vcc voltage is generated from mains supply voltage UN via a rectifier D4 coupled to bridge rectifier input terminal i and a resistor R51 coupled to rectifier D4 and voltage supply terminal c.

Similarly, during run mode operation of the switched power supply, collector current for driver transistor T2 is obtained, each switching cycle of output switching transistor T1, from secondary winding section 6a after transistor T1 has become conductive, thereby inducing a positive voltage at the undotted terminal of winding section 6a. The collector current is obtained from winding section 6a via a rectifier D2 and an inductor L2 in parallel with a resistor R2. During the start-up interval, collector current for transistor T2 is supplied from a capacitor C4 via a resistor R23. Capacitor C4 also supplies collector current for transistor T2 during run mode operation in conjunction with the current being supplied via network 4. Capacitor C4 is charged from AC mains voltage UN via rectifier D4 and a resistor R4. A diode D3, having its anode coupled to the collector of transistor T2 and its cathode coupled to capacitor C4, provides voltage spike damping of the collector electrode voltage by shunting current from inductor L2 into capacitor C4 as transistor T2 is turned off.

When transistor T1 is switched off by control voltage 9, induced voltage pulses are generated in all the windings of transformer Tr such that the dotted terminal of each winding is positive relative to the undotted terminal. The induced pulse voltage developed in secondary winding 11 forward biases rectifier D6 and recharges capacitor C6 to replenish the energy lost by the capacitor to load RL during that portion of each switching cycle when rectifier D6 is blocked.

During the off-time of transistor T1, the stored magnetic energy in transformer Tr is discharged into the secondary side loads such as capacitor C6 and load RL. The discharge of stored magnetic energy is in the form of a current flowing out of secondary winding 11 into capacitor C6 and load RL via conducting rectifier D6. When substantially all the stored magnetic energy has been transferred to the secondary side loads of transformer T1, the current in the secondary windings decreases to zero.

When the current in secondary winding 11 decreases to zero, rectifier D6 becomes blocked and a deadtime interval commences. In the deadtime interval, neither rectifier D6 nor transistor T1 is conductive and transformer Tr remains in an energy discharged state. To end the deadtime interval and initiate a new magnetic energy storage interval, control circuit 5 develops the high-state of switching control signal 9 that again turns on transistor T1.

The operating mode just described for the switched power supply operating with current mode regulation of FIG. 1 is a flyback converter mode of operation where energy stored in the transformer during the on-time of the switching transistor is transferred to the secondary side load circuits during the off-time of the transistor when the induced secondary winding voltages forward bias the secondary side rectifiers.

Control circuit 5 regulates the operating voltage +U0, by pulse width modulating the switching control voltage 9 to pulse width modulate the switching of transistor T1, thereby pulse width modulating the pulse voltage developed in secondary winding 11.

The pulse width modulation provided by control circuit 5 varies the on-time of switching transistor T1, without affecting the pulse initiation frequency, during each cycle of the transformer pulse voltages in accordance with a feedback voltage Ur that is representative of the level of DC operating voltage +U0. The dotted terminal of secondary winding section 6b is coupled via a resistor R19 to the anode of a rectifier D5 of a DC rectifier and filtering circuit 12 to develop feedback voltage Ur at a terminal d. A transient bypass capacitor C20 is coupled to the anode of rectifier D5. The filter section of circuit 12 comprises a capacitor C5 in parallel with a resistor R5.

When rectifier D6 of secondary supply circuit 21 is conducting, the +U0 operating voltage is applied across secondary winding 11, generating across secondary winding section 6b a transformed voltage having a level equal to the level of the +U0 operating voltage, multiplied by the transformer turns ratio of winding section 6b to winding 11. The transformed operating voltage level developed during the off-time of transistor T1 is then rectified by rectifier circuit 12 to generate feedback voltage Ur.

Feedback voltage Ur is applied to a pulse width modulating input terminal e of control circuit 5 via an impedance 25. The voltage at terminal e, representative of operating voltage +U0, varies the on-time, but not the start-time, of transistor T1 in such a manner as to stabilize the level of the operating voltage. Should the level of operating voltage +U0 decrease, for example, the on-time of transistor T1 is made longer within each switching cycle to store more energy in transformer Tr at the end of the transistor on-time. More energy is thus discharged into secondary supply circuit 21 during the off-time of the transistor to restore operating voltage +U0 to its stabilized level.

To vary the on-time of transistor T1 in order to stabilize operating voltage +U0, feedback voltage Ur is coupled via input terminal e to a pulse width modulator 15 within control circuit 5. Pulse width modulator 15 controls the output of a controllable oscillator 14, which oscillator generates switching control voltage 9 at output terminal g of control circuit 5. Pulse width modulator 15 establishes the high-level to low-level duty cycle of switching control voltage 9 in accordance with feedback voltage Ur to vary the on-time of transistor T1 in the manner previously described.

In accordance with an aspect of the invention, the frequency of switching control voltage 9 is varied by the voltage developed at a frequency control input f of oscillator 14. Increasing the voltage at frequency control terminal f increases the frequency of oscillator 14, thereby increasing the frequency of switching control voltage 9 and the switching operation of transistor T1. Conversely, decreasing the voltage at frequency control input terminal f decreases the frequency of oscillator 14, thereby decreasing the frequency of switching control voltage 9 and the switching operation of transistor T1. The on-time of transistor T1 for a given controlled frequency of oscillator 14 is, however, determined by feedback voltage Ur applied to the pulse width modulating input terminal e of control circuit 5. In this regard, pulse width modulator 15 may be located downstream of oscillator 14 between the oscillator output and control terminal g. The pulse width modulator in this instance takes the frequency controlled output oscillator 14 and pulse width modulates the oscillator output in accordance with the Ur voltage feedback at pulse width modulating input terminal e.

In accordance with a feature of the invention, feedback voltage Ur is also applied to frequency control input terminal f via resistor 13 to control the frequency of oscillator 14 and thus to control the frequency of switching transistor T1 as a function of the level of operating voltage +U0.

Voltage +Uo is a closely regulated voltage. Accordingly, voltage Ur, which tracks voltage +Uo, will tend to exhibit only small variations during normal operation. Such small variations are sufficient to effect the pulse width modulation needed to maintain regulation. However, the small variations are of insufficient magnitude to substantially alter the switching control voltage, and thus change the switching frequency.

Typically, abnormal operating conditions will result in large currents drawn from the derived secondary supply 21, together with a significant drop in voltage +Uo. The pulse width modulation control is a negative feedback loop which will attempt to deliver more and more energy into the transformer, thus making the overload condition worse. In a current mode switching power supply, the current flowing through the primary winding 2 when transistor T1 is conducting is monitored and limited. Control circuit 5 may therefore comprise a current limiter circuit which senses overload current levels and disables the pulse width modulation control. Such a current limiter circuit provides a means for detecting normal and abnormal operating conditions. In the absence of further regulation, voltage Ur falls rapidly and the switching frequency falls rapidly. As the switching frequency falls, the overload current tends to fall as well, in a positive feedback control loop. If it falls sufficiently low to fall below the overcurrent threshold, the pulse width modulation will again exert influence on the level of voltage +Uo.

Control circuit 5 effectively prevents feedback voltage Ur from reducing output voltage +U0 by effecting a significant change in switching frequency until a certain control range from pulse width modulation responsive to feedback voltage Ur has been exhausted. This may be accomplished, for example, by providing a higher gain factor for the negative feedback loop than for the positive feedback loop. This will minimize the effect of the positive feedback loop during normal operation. The range generally corresponds to voltage variations not accompanied by current overload conditions. Accordingly, the switching frequency remains substantially constant during normal operation and normal loading variations. The threshold for commencing frequency control can be adjusted externally, for example, by selecting the respective values of resistors R3, R5, R13 and R25. When operating voltage +U0 decreases during abnormal operation, feedback voltage Ur produces a decrease in the frequency of oscillator 14 and thus a decrease in the switching frequency of switching transistor T1. By decreasing the switching frequency of transistor T1 when the level of operating voltage +U0 decreases, a hazardous situation is avoided during abnormal operation of the switched power supply.

Consider an abnormal operating condition where load RL takes excessive current from secondary supply circuit 21. The pulse width modulator circuit in control circuit 5 attempts to supply the excessive current to load circuit RL by substantially increasing the on-time of transistor T1 to store a greater amount of energy in transformer Tr. Because of the substantially increased stored energy during the overload condition, an excessively long discharge interval may be required during the off-time of the transistor to fully discharge the magnetic energy in transformer Tr prior to the next cycle turn-on of transistor T1. Transformer Tr, not being fully discharged by the time transistor T1 turns back on, generates excessively high current and voltage levels that may overstress various components in the switched power supply, such as the transformer itself and switching transistor T1.

In accordance with a feature of the invention, by means of the feedback of voltage Ur to frequency control input terminal f of controllable oscillator 14, the frequency of oscillator 14 and thus of control voltage 9 is decreased during the abnormal overload condition due to the sensed decrease in operating voltage +U0. The decrease is to a frequency that is low enough to permit transformer Tr to fully discharge its stored magnetic energy before the oscillator again turns on switching transistor T1. For example, during normal operation, the interval between turn-on instants of transistor T1 may be as short as 20 microseconds, whereas during abnormal operation, the interval between turn-on instants may be significantly lengthened to around 400 microseconds.

During current limiting, the change in the frequency of control voltage 9 may advantageously take place on a continuous basis by means of the frequency control feedback of operating voltage Ur. The frequency range may vary throughout all intermediate values from a low end of the frequency range of 2.5 kilohertz, associated with worst-case abnormal operation, up to a high end of around 50 kilohertz at which normal operation takes place. At the high end, the voltage stabilizing negative feedback loop of the pulse width modulator predominates, whereas at the low end, the positive feedback loop of the frequency control voltage predominates. Voltage Ur forms part of both the negative and positive feedback loops.

An alternative embodiment is shown in FIG. 2. The circuit schematic of FIG. 2 also illustrates in more detail operation of the invention with a suitable integrated circuit control 5'. The control circuit shown is part no. UC3842, available from Unitrote Corp., Lexington, Mass. The circuit in FIG. 2 differs from the circuit in FIG. 1, primarily insofar as transistor T2 has been eliminated. Instead, the output of the control circuit drives transistor T1 directly. The circuits shown in FIGS. 1 and 2 are otherwise generally similar in operation, and like reference numerals and designations a through i have been used wherever appropriate.

With reference to FIG. 2, and as in FIG. 1, the source of AC mains supply voltage UN is coupled between input terminals h and i of full-wave bridge rectifier 1, to generate filtered DC input voltage +UB between output terminal a of the bridge rectifier and current return terminal b, which may be considered an earth or ground point. Capacitor CL provides filtering of input voltage +UB. AC mains supply voltage UN is unregulated and may vary between 90 VAC and 260 VAC.

Input voltage +UB is applied to the undotted end terminal of primary winding 2 of switched mode power supply transformer Tr. The dotted end terminal of primary winding 2 is coupled through a resistor R30 to the collector of output switching transistor T1. The emitter of transistor T1 is grounded through small sampling resistor R3 that samples the current in primary winding 2. Capacitor C26 filters the current-sampled voltage developed across resistor R3. Resistor R3 provides current limiting of the current in transistor T1 to prevent too great a current from flowing and damaging the transistor. Additionally, the voltage at the emitter of transistor T1, being proportional to the current in primary winding 2, may be used for controlling a short-circuit protection circuit, not shown.

Secondary winding 11 of transformer Tr is coupled to the supply circuit 21 that generates regulated DC operating voltage +U0 for supplying energy to the load circuit, schematically shown as load resistor RL. In supply circuit 21, the anode of rectifier or diode D6 is coupled to the dotted terminal of secondary winding 11 and the cathode is coupled to one terminal of filter capacitor C6. The other terminal of filter capacitor C6 is coupled to the undotted terminal of secondary winding 11. The load circuit RL is coupled across capacitor C6 and is energized by the +U0 voltage which is developed across and filtered by the capacitor.

The +U0 operating voltage is generated by the switching of transistor T1. Transistor T1 is pulse-width modulated at a frequency that is determined in accordance with a pulse-width modulated, switching control voltage 9 developed at output control terminal g, at pin 6 of a control circuit 5'. Switching control voltage 9 is coupled to the base of transistor T3 through resistor R31 and coupled to impedance network 10 through resistor R32. Impedance network 10 comprises Zener diode Z1 in parallel with a speed-up capacitor C1. Transistor T3 has an emitter coupled to the junction of resistor R32 and impedance network 10 through a diode D30, and has a collector coupled to ground through capacitor C17. Impedance network 10 is coupled at its other junction of capacitor C1 and Zener diode Z1 to impedance network 4. Impedance network 4 comprises an inductor L1 in parallel with resistor R1. Impedance network 4 is also coupled to the base of transistor T1. Resistor R15 is coupled between the base and emitter of transistor T1. The junction of the emitter of transistor T1, resistor R3, resistor R15 and capacitor 26 is also coupled to the common tap of windings 6a and 6b.

In normal operation, during each cycle of the on-off switching of transistor T1, the high-level of switching control voltage 9 provided by control circuit 5' is level-shifted by Zener diode Z1. Current is supplied to the base of transistor T1 by impedance network 4 to turn the transistor on. Transistor T3 is off at this time, as its emitter to base junction is reverse biased.

Control circuit 5' generates the low-level of switching control voltage 9 to turn switching transistor T1 off. The low-level of switching control voltage 9 turns on transistor T3. With transistor T3 conductive, a negative voltage, developed across a capacitor C17, is applied to the base of switching transistor T1 via impedance networks 10 and 4 to turn transistor T1 off quickly.

The negative voltage is developed across capacitor C17 via rectifiers D18a and D18b which rectify the voltage induced across winding section 6a of secondary winding 6 during the off-time of transistor T1. The magnitude of the negative voltage is limited by Zener diode Z2.

During the run mode operation, and after a start-up interval has elapsed, the Vcc supply voltage for control circuit 5', developed at terminal c is derived from the voltage developed in secondary winding section 6b by rectifier D7 and capacitor C8. During the start-up interval, however, when no voltage or only small amplitude voltages are generated in transformer Tr, the Vcc voltage is generated from mains supply voltage UN via a rectifier D4 coupled to bridge rectifier input terminal i and resistor R51 coupled to rectifier D4 and voltage supply terminal c.

In accordance with the flyback converter mode of operation, induced voltage pulses are generated in all the windings of transformer Tr when transistor T1 is switched off. The dotted terminal of each winding is positive relative to the undotted terminal. The induced pulse voltage developed in secondary winding 11 forward biases rectifier D6 and recharges capacitor C6 to replenish the energy lost by the capacitor C6 to load RL during that portion of each switching cycle when rectifier D6 is blocked.

During the off-time of transistor T1, the stored magnetic energy in transformer Tr is discharged into the secondary side loads such as capacitor C6 and load RL. The discharge of stored magnetic energy is in the form of a current flowing out of secondary winding 11 into capacitor C6 and load RL via conducting rectifier D6. When substantially all the stored magnetic energy has been transferred to the secondary side loads of transformer T1, the current in the secondary windings decreases to zero.

Integrated control circuit 5' controls the switching of transistor T1 to regulate the output voltage supply +U0. The UC3842 is typical of a number of integrated circuit control chips which are suitable for effecting current mode control in a switched power supply. The invention takes advantage of current mode operation in a novel manner, which: assures voltage regulation at a substantially constant pulse initiation, or start-time, frequency during normal conditions of pulse width modulation; provides for pulse initiation, or start-time, frequency reduction during abnormal conditions; and, effects both the pulse width modulation and the frequency control responsive to the same DC voltage feedback signal. Efficiency and safety are markedly improved.

The control circuit 5', as embodied by a UC3842 integrated circuit, operates from a low impedance DC source of 10 volts to 30 volts. Operation between 10 volts and 16 volts requires a startup bootstrap to a voltage greater than 16 volts in order to overcome an internal undervoltage lockout. Vcc is internally clamped to 34 volts for operation from higher voltage, current limited sources. An undervoltage lockout UVLO circuit ensures that Vcc is adequate to make the circuit fully operational before enabling the output stage. The UVLO turn on and turn off thresholds are fixed internally at 16 volts and 10 volts, respectively. The 6 volt hysteresis prevents Vcc oscillations during power sequencing. The output driver is biased to a high impedance state during undervoltage lockout.

The oscillator OSC has an operating frequency determined by the capacitance ($C_T$) between pin 4 ($R_T/C_T$) and pin 5 (GND), and the resistance ($R_T$) between pin 4 ($R_T/C_T$) and a reference voltage. Typically in the prior art, and unlike in the inventive circuit of FIG. 2 the reference voltage is taken from pin 8 ($V_{REF}$). When so connected, the oscillator timing capacitance $C_T$ may be charged from $V_{REF}$ (5 volts) through an external timing resistance and discharged by an internal current source. During the discharge time, the internal clock signal blanks the output to the low state. According to an aspect of this invention, by way of contrast, the reference voltage for charging the timing capacitance is not fixed, internally or externally.

The frequency is controlled by a feedback voltage, for example Ur, related to the operating voltage +UO. Operating voltage +UO is closely regulated and results in a substantially constant reference voltage during normal operation. This reference varies when the operating voltage falls out of regulation, because current limiting in the current sense comparator CSC, as explained below, prevents the pulse width modulating circuit from trying to maintain the operating voltage during abnormal operation by ever increasing the on-time of the output switch. Such abnormal operation includes, for example, overload and short circuit conditions.

The startup reference signal is a half wave rectified voltage signal developed by diode D4 and coupled to pin 4 through resistors R5 and R34. The startup voltage is also supplied to the integrated circuit as Vcc at pin 7. After startup a half wave rectified voltage signal developed by diode D7, supplies the Vcc voltage to the integrated circuit during steady state operation. This voltage is coupled to pin 4 through resistor R34. The startup voltage is effectively supplanted after the startup interval.

An error amplifier is provided for controlling the pulse width modulation. The error amplifier has a non-inverting input internally biased to a voltage source of 2.5 volts. The error amplifier output is available at pin 1 (COMP) for external compensation to control the closed loop frequency response, for example by resistor R40 and capacitor C21. The output of the error amplifier undergoes two diode drops, and is scaled in magnitude by the resistive voltage divider formed by resistors R and 2R. The maximum effective output of the error amplifier circuit is limited at 1 volt by a Zener diode coupled in parallel with resistor R. The magnitude limited output of the voltage divider is coupled to the inverting input of the current sense comparator CSC. The current conducted by transistor T1 is monitored at the $I_{SENSE}$ input, pin 3. A current to voltage conversion is done externally, for example, with a ground reference resistor R3. The inverting input to the current sense comparator is internally clamped to 1 volt by the Zener diode. Current limiting, indicative of abnormal operation, occurs if the voltage at the non-inverting input from pin 3 reaches this threshold value. This condition inhibits operation of the CSC gate, and thereby inhibits the pulse width modulation control. This condition also defines the limit of the range of normal operation subject to regulation by pulse width control. If the abnormal condition persists, voltage Ur falls sufficiently to lower the switching or pulse initiating frequency. The maximum current is a function of the turns ratio of the feedback winding to the primary winding switched by transistor T1, and the value of the external resistance R3.

The control circuit has a single totem pole output formed by transistors T4 and T5. The pulse width modulating latch PWML ensures that only a single pulse appears at the output in any one oscillator period. This avoids excessive power transistor dissipation and potential saturation of magnetic elements.

The control circuit can be shut down according to the prior art by two methods, either raising pin 3 above one volt or pulling pin 1 below one volt. Either method causes the output of current sense comparator to be locked high. The pulse width modulator latch is reset dominant so that the output will remain low until the first clock pulse following removal of the shutdown signal at pin 1 or pin 3.

Feedback voltage Ur, representative of the level of DC operating voltage +U0 is developed at a terminal d. The dotted terminal of secondary winding section 6b is coupled via resistor R19 to the anode of rectifier D5 of DC rectifier and filtering circuit 12. Transient bypass capacitor C20 is coupled to the anode of rectifier D5. The filter section of circuit 12 comprises capacitor C5 in parallel with resistor R5.

When rectifier D6 of secondary supply circuit 21 is conducting, the +U0 operating voltage is applied across secondary winding 11, generating across secondary winding section 6b a transformed voltage having a level that is equal to the level of the +U0 operating voltage, multiplied by the transformer turns ratio of winding section 6b to winding 11. The transformed operating voltage level developed during the off-time of transistor T1 is then rectified by rectifier circuit 12 to generate feedback voltage Ur at terminal d.

Feedback voltage Ur is applied to a pulse width modulating input terminal e ($V_{FB}$, pin 2) of control circuit 5' via resistor R25, which forms a voltage divider with resistor R35. The voltage at terminal e, representative of operating voltage +U0, varies the on-time, but not the pulse initiation or start-time, of transistor T1 to stabilize the level of the operating voltage. Should the level of operating voltatge +U0 decrease, for example, the on-time of transistor T1 is made longer within each switching cycle to store more energy in transformer Tr at the end of the transistor on-time. More energy is thus discharged into secondary supply circuit 21 during the off-time of the transistor to restore operating voltage +U0 to its stabilized level.

To vary the on-time of transistor T1 in order to stabilize operating voltage +U0, feedback voltage Ur is coupled via input terminal e to the error amplifier within control circuit 5'. The error amplifier controls the pulse width modulating latch to vary the cutoff time of the output pulses initiated by the oscillator OSC which controls the switching control voltage 9 generated at output terminal g (pin 6) by transistors T4 and T5. The high-level to low-level duty cycle of switching control voltage 9 varies in accordance with feedback voltage Ur to vary the on-time of transistor T1 in the manner previously described.

The frequency of oscillator OSC varies directly with the voltage at terminal f, pin 4. This voltage tends to be maintained at a substantially constant value by the substantially constant reference voltage supplied to capacitor $C_T$ by diode D7 and resistor R34. Capacitor $C_T$ has one terminal coupled to Vcc through resistor R34 and coupled to Ur through resistor R13. The other terminal of capacitor $C_T$ is coupled to ground. As long as the variation of voltage Ur is within the range of safe current levels, the pulse initiation, or start-time, frequency will remain substantially constant. However, when Ur falls so low that the current limiter becomes effective, the pulse width modulation circuit cannot increase the on-time of the output switch any further, and the operating voltage +U0 falls. As the operating voltage +U0 falls, the feedback voltage Ur falls. As the feedback voltage Ur falls, the reference voltage at pin 4 of circuit 5' falls, so that capacitor $C_T$ charges more slowly. As the voltage at terminal f falls, the frequency of oscillator OSC falls. The values of resistors R3, R34, R13, R5, R25 and R35 may be selected to determine the extent of the range and the proportion of control exercised respectively by the pulse width modulation and the frequency control, responsive to the same feedback signal. The values may be selected, for example, to provide a higher gain factor for the negative feedback loop than for the positive feedback loop. This will minimize the effect of the positive feedback loop during normal operation, prior to current limiting conditions.

As in the embodiment of FIG. 1, change in the frequency of control voltage 9 may advantageously take place on a continuous basis during current limiting by means of the frequency control feedback of operating voltage Ur, over a wide range.

What is claimed is:

1. A switched power supply operating with current mode regulation, comprising:
    a source of input supply voltage;
    a transformer;
    an output switch coupled to a first winding of said transformer and to said source and responsive to a control signal for initiating a pulse width modulated pulse voltage in a second winding of said transformer in accordance with a switching frequency of said output switch;
    a supply circuit including a rectifier coupled to said second winding for generating an operating voltage;
    a feedback signal source, having means for monitoring current flowing through said first winding and for monitoring said operating voltage;
    a control circuit coupled to said feedback signal source, said control circuit including an oscillator for generating said control signal at a substantially constant frequency during normal operation and at a variable frequency during abnormal operation, said control circuit being responsive to said current and to variations of said operating voltage over a regulating range and in a negative feedback loop, for varying said control signal in a manner that varies the on-time conduction of said output switch within each cycle of said pulse voltage to stabilize said operating voltage; and, a frequency control for said oscillator responsive to variations of said operating voltage outside of said regulating range, in a positive feedback loop.

2. A power supply according to claim 1, further comprising a current limiting circuit for limiting said on-time conduction of said output switch to a maximum value by comparing said current to an error signal which varies when said operating voltage is within said regulating range but is limited in magnitude when said operating voltage falls below said regulating range.

3. A power supply according to claim 1, wherein a DC feedback voltage signal representative of said operating voltage forms a part of both said negative and positive feedback loops.

4. A power supply according to claim 3, wherein said feedback signal source comprises:
a third winding of said transformer;
a second rectifier coupled to said third winding and made conductive when said output switch is non-conductive; and
a filter for developing a DC voltage representative of said operating voltage as said DC feedback voltage.

5. A power supply according to claim 4, wherein said DC feedback voltage is coupled to a frequency control input and to a pulse width modulating control input of said control circuit through respective coupling networks establishing different gain factors for said negative and positive feedback loops.

6. A power supply according to claim 1, wherein for each said cycle of said pulse voltage, magnetic energy is stored in said transformer from said source during said on-time conduction of said output switch and said stored magnetic energy is discharged from said transformer to said supply circuit during the off-time of said output switch when said rectifier is conducting, in a flyback converter mode of operation that results in a deadtime during said each said cycle when neither said output switch nor said rectifier is conducting.

7. A power supply according to claim 6, wherein during said abnormal operation, where said magnetic energy stored in a given cycle tends not to fully discharge into said supply circuit during that cycle, and said operating voltage falls outside said regulating range, said oscillator responds to a decrease in said operating voltage by decreasing said switching frequency to a frequency that ensures substantially full discharge of said stored magnetic energy.

8. A switched power supply operating with current mode regulation, comprising:
a source of input supply voltage;
a transformer;
an output switch coupled to a first winding of said transformer and to said source and responsive to a control signal for initiating a pulse width modulated pulse voltage in a second winding of said transformer in accordance with a switching frequency of said output switch;
a supply circuit including a rectifier coupled to said second winding for generating an operating voltage;

a feedback signal source, having means for monitoring current flowing through said first winding and for monitoring said operating voltage;
an oscillator for generating said control signal;
a control circuit for said oscillator, responsive to an error signal related to variation of said operating voltage in a regulating range for varying said control signal in a manner that varies the on-time conduction of said output switch within each cycle of said pulse voltage to stabilize said operating voltage during normal operation;
means for limiting said on-time conduction of said output switch responsive to detection of an error signal value corresponding to said operating voltage falling outside said regulating range; and,
a frequency control for said oscillator for varying the repetition frequency of said control signal such that said switching frequency of said output switch varies when said operating voltage falls outside said regulating range, decreasing with decreasing operating voltage, but otherwise remains substantially constant.

9. A power supply according to claim 8, wherein said control circuit increases said on-time conduction of said output switch within each cycle of said pulse voltage in response to a decrease in said operating voltage within said regulating range.

10. A power supply according to claim 8, wherein said feedback signal source comprises:
a third winding of said transformer;
a second rectifier coupled to said third winding and made conductive when said output switch is non-conductive; and
a filter for developing a DC feedback voltage proportional to said operating voltage, said error voltage being related to said DC feedback voltage.

11. A power supply according to claim 10, further comprising a pulse width modulating control for said control circuit for generating said error signal responsive to said DC feedback voltage for varying the duty cycle of said control signal to increase said on-time conduction of said output switch within each cycle of said pulse voltage to stabilize said operating voltage as said operating voltage decreases within said regulating range.

12. A power supply according to claim 8, wherein for each said cycle of said pulse voltage, magnetic energy is stored in said transformer from said source during said on-time conduction of said output switch and said stored magnetic energy is discharged from said transformer to said supply circuit during the off-time of said output switch when said rectifier is conducting in a flyback converter mode of operation that results in a deadtime during said each said cycle when neither said output switch nor said rectifier is conducting.

13. A power supply according to claim 12, wherein during said abnormal operation, where said magnetic energy stored in a given cycle tends not to fully discharge into said supply circuit during that cycle, and said operating voltage falls outside said regulating range, said oscillator responds to a decrease in said operating voltage to decrease said switching frequency to a frequency that ensures a substantially full discharge of said stored magnetic energy.

14. A power supply according to claim 8, wherein said feedback signal is coupled to two inputs of said control circuit through respective coupling networks, forming part of respective positive and negative feedback control loops for said control circuit.

15. A power supply according to claim 14, wherein said negative feedback loop controls said variation of said on-time conduction of said switch and said positive feedback loop controls said repetition frequency of said switch.

16. A power supply according to claim 15, wherein said coupling networks provide a higher gain factor for said negative feedback loop than said positive feedback loop.

17. A switched power supply operating with current mode regulation, comprising:
a source of input supply voltage;
a transformer;
an output switch coupled to a first winding of said transformer and to said source and responsive to a control signal for initiating a pulse width modulated pulse voltage in a second winding of said transformer in accordance with a switching frequency of said output switch;
a supply circuit coupled to said second winding for generating an operating voltage;
a feedback signal source, having means for monitoring current flowing through said first winding and for monitoring said operating voltage; and,
a control circuit coupled to said feedback signal source, said control circuit including an oscillator for generating said control signal at a substantially constant frequency during normal operation and at a variable frequency during both a start-up interval and during abnormal operation, said oscillator having a frequency control responsive to a reference signal which remains substantially constant when said operating voltage is within a regulating range during said normal operation but which varies when said operating voltage is outside said regulating range, said control circuit being further responsive to a feedback signal for varying said control signal in a manner that varies the on-time conduction of said output switch within each cycle of said pulse voltage to stabilize said operating voltage within said regulating range during said normal operation.

18. A power supply according to claim 17, wherein said reference signal is related to said operating voltage during said normal operation and during said abnormal operation.

19. A power supply according to claim 17, further comprising means for distinguishing between said normal and said abnormal operation by monitoring said current and said operating voltage.

20. A power supply according to claim 17, further comprising an overcurrent detector for limiting said on-time conduction of said output switch responsive to said operating voltage falling outside said regulating range.

21. A power supply according to claim 17, wherein said reference signal and said feedback signal are both related to a common feedback voltage signal, said feedback voltage signal forming part of a negative feedback loop for controlling said on-time conduction of said output switch and a positive feedback for controlling said switching frequency.

22. A power supply according to claim 21, further comprising:
a third winding of said transformer;
a second rectifier coupled to said third winding and made conductive when said output switch is nonconductive; and,
a filter coupled to said rectifier for generating a DC voltage as said feedback signal.

23. A switched power supply operating with current mode regulation, comprising:
a source of input supply voltage;
a transformer;
an output switch coupled to a first winding of said transformer and to said source and responsive to a control signal for initiating a pulse width modulated pulse voltage in a second winding of said transformer in accordance with a switching frequency of said output switch;
a supply circuit coupled to said second winding for generating an operating voltage;
an oscillator for generating said control signal;
a pulse width control circuit for said oscillator, said pulse width control circuit being responsive to a first feedback loop signal related to said operating voltage for varying said control signal in a manner that varies the on-time of said output switch within each cycle of said pulse voltage to stabilize said operating voltage during normal operation;
means for detecting abnormal operation of said power supply;
a frequency control circuit for said oscillator responsive to said detecting means and a second feedback loop signal for varying the switching frequency of said control signal during said abnormal operation such that the switching frequency of said output switch decreases with decreasing operating voltage, said frequency control circuit continuously varying the switching frequency between low and high ends of a range; and,
said pulse width control circuit for varying the on-time of said output switch predominating in controlling said output switch at said high end of said range and said frequency control circuit for varying the switching frequency of said output switch predominating at said low end of said range.

24. A power supply according to claim 23, comprising respective networks for coupling said first and second feedback loop signals to said pulse width and frequency control circuits, said coupling network for said first feedback loop signal having a higher gain factor than said coupling network for said second feedback loop signal.

25. A power supply according to claim 23, wherein said detecting means comprises a threshold detector having as an input an error signal related to said operating voltage, said error signal having a maximum value corresponding to onset of said abnormal operation.

26. A power supply according to claim 23, further comprising a feedback signal source for monitoring current flowing through said first winding and for monitoring said operating voltage, both said first and second feedback loop signals being related to a common feedback voltage signal from said feedback signal source.

27. A power supply according to claim 26, wherein said pulse width control circuit is responsive to variations of said operating voltage and said current and said frequency control circuit is responsive only to variations of said operating voltage.

28. A power supply according to claim 23, wherein said pulse width control circuit limits the on-time of said output switch to a maximum value during said abnormal operation.

* * * * *